Jan. 1, 1929. 1,697,667

I. SLAFSKY

MECHANICAL TOY

Filed April 9, 1928 2 Sheets-Sheet 1

Inventor:
Isadore Slafsky
Att'y

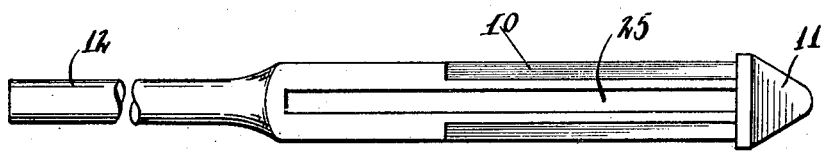
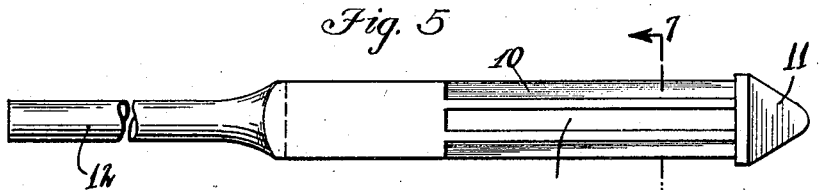
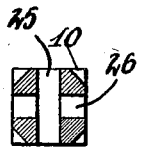
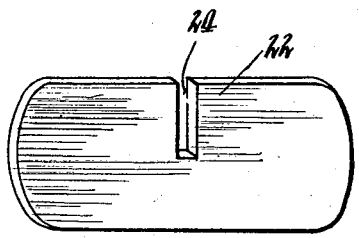
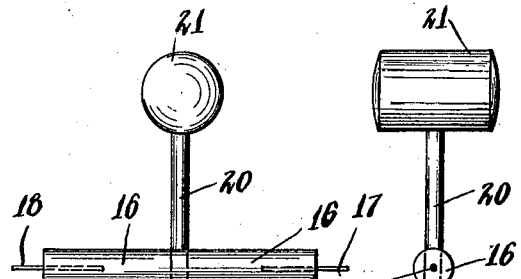
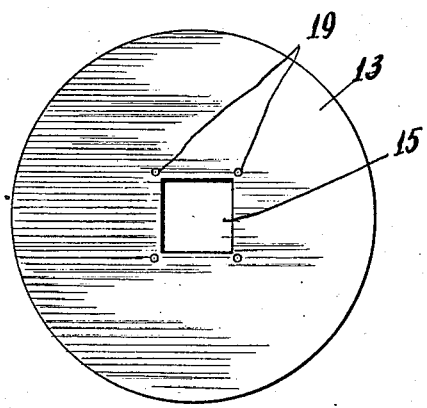
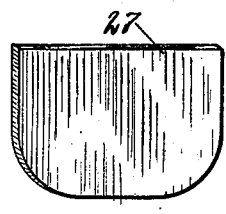
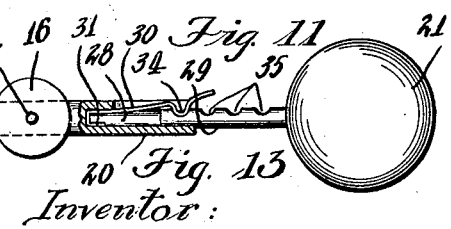

Patented Jan. 1, 1929.

1,697,667

UNITED STATES PATENT OFFICE.

ISADORE SLAFSKY, OF BROOKLYN, NEW YORK.

MECHANICAL TOY.

Application filed April 9, 1928. Serial No. 268,572.

This invention relates generally to devices adapted for making a noise during celebrations, merry making and the like, and in particular to a new and novel noise making device.

The object of the invention is to provide a device of the class described of novel construction and arrangement of parts, hereinafter more fully described, claimed and illustrated in the accompanying drawing.

Fig. 5 is a detail side elevational view of the handle member as embodied in my improved device.

Fig. 6 is a similar view to that shown in Fig. 5.

Fig. 7 is a transverse sectional view taken on the line 7—7 in Fig. 6.

Fig. 8 is a detail perspective view of the sounding boards, as embodied in my improved device.

Fig. 9 is a detail view of the hammer.

Fig. 10 is an end elevational view thereof.

Fig. 11 is a detail view of the wedge as embodied in my improved device.

Fig. 12 is a detail view of the retaining disc, as embodied in my improved device.

Fig. 13 is a similar view to that shown in Fig. 10, partly in section, illustrating a further development of my improved device.

Figure 1:
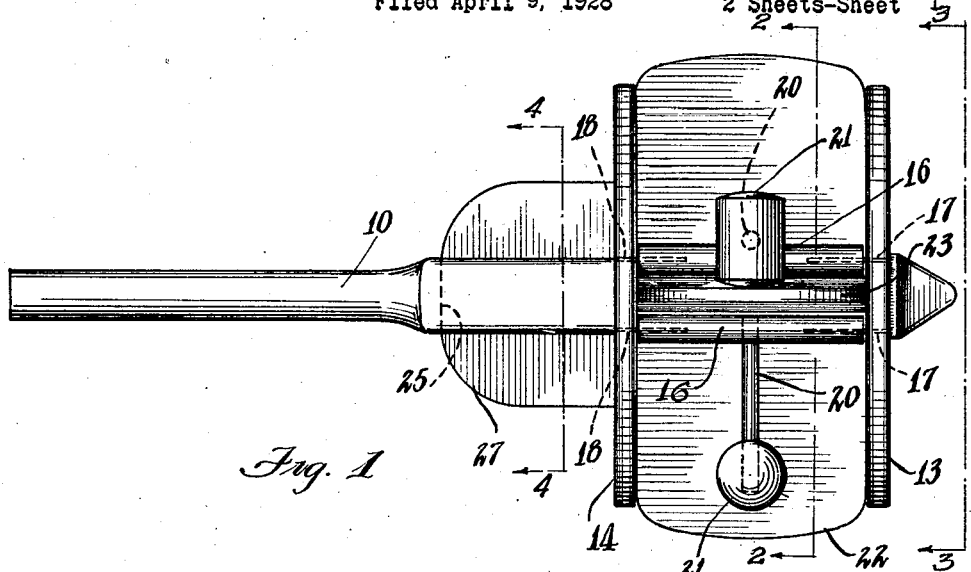
Fig. 1 is a side elevational view of my improved device.

As here embodied my improved device comprises a handle member 10, provided with an enlarged head 11, and a handle element 12, extended therefrom. A pair of retaining members 13 and 14, or discs, are of circular construction, and have formed therein an axial aperture 15, preferably of square shape, so as to slidably engage over the handle member 10, which is similarly shaped. The hammers as embodied in my improved device comprises a plurality of cylindrical members 16, having secured thereto, at the axial center thereof, and extended therefrom, at either extremities, pins 17 and 18, adapted to freely engage in the apertures 19 formed in the retaining members 13 and 14, adjacent to the axial aperture 15. The rods 20 are secured to the intermediate portion of the cylindrical members 16 and are extended therefrom, at approximately right angles thereto. The enlarged members 21 or heads are secured to the free extremities of the rods 20. A pair of sounding boards 22 and 23 have formed therein intermediate elongated openings 24, or slots, extending to the center portion thereof.

It will be understood that my device may be sold to the public, unassembled, if so desired, so as to provide entertainment or occupation to the person purchasing same.

Figures 2, 3:
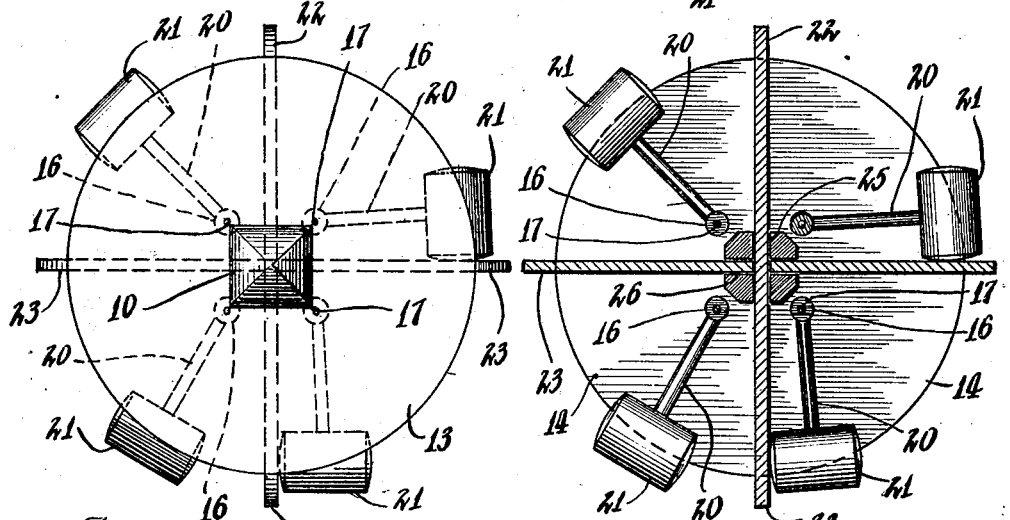
Fig. 2 is a transverse sectional view taken on the line 2—2 of Fig. 1.
Fig. 3 is a top plan view thereof, as viewed from the line 3—3 of Fig. 2.

My improved device is assembled as follows, one of the retaining discs 13, is slidably engaged in the handle member 10, in contact with the enlarged head 11. The sounding board 22 is then inserted through the elongated slot 25, formed in the handle member 10, and is positioned in contact with the retaining disc, 13. The second sounding board 23 is then inserted through the elongated slot 26, formed in the handle member 10, at a right angle to the said slot 25, formed therein. The said openings 24, are formed in the sounding boards 22 and 23, permitting the said sounding boards to interlock as clearly shown in Fig. 2 of the accompanying drawing. The second retaining disc 14 is then slidably engaged over the handle member 10, the said hammers being assembled in the said retaining discs, as above set forth. The wedge 27 is then engaged in the lower portion of the slot 25 which is comparatively longer than the said slot 26, below the retaining disc 14, so as to securely hold my improved device in an assembled position.

The above described construction is such as will permit the said hammers to strike the sounding boards, so as to make a noise, when my improved device is rotated, or twirled in the hands.

In Fig. 13 of the accompanying drawing, I have shown the rods 20, provided with axial openings 28, adapted to slidably receive the rods 29, secured to and extended from the heads 21. The springs 30 are formed or bent, as at 31, so as to firmly engage in the said openings 28, and are provided with free extremities 32, extended therefrom, through elongated slots 33 formed in the said rods 31. The springs 30 are provided with an inwardly protruding intermediate portion 34, adapted to engage in the notches 35 formed in the rods 29, so as to hold the said hammers in any desired extended positions. It should be understood that the springs 30 are constructed of spring steel, so as to be normally urged inwardly, as a means of securely holding the said enlarged heads 21 in the extended positions, as above set forth.

Figures 4, 14:
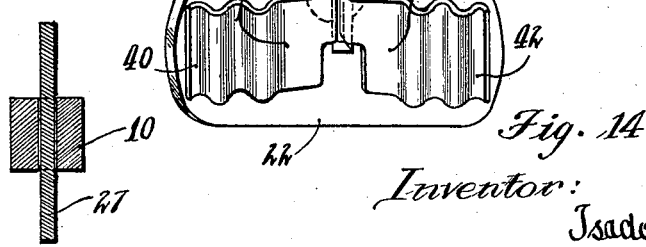
Fig. 4 is a transverse sectional view taken on the line 4—4 of Fig. 1.
Fig. 14 is a similar view to that shown in Fig. 8 illustrating the further development of my improved device.

In Fig. 14 of the accompanying drawing, I have shown the sounding boards 22 and 23 provided with notches 36 and 37, formed therein, adjacent to the elongated openings 24 adapted to receive the supplementary sounding boards 38 and 39, respectively, adapted to engage in the said notches, and which are extended therefrom, on both sides of the sounding boards. The supplementary sounding boards are formed or bent corrugated, and have free extremities 40, 41 and 42, 43, respectively. The above described construction is such as will permit the said hammers to be extended so as to permit the said hammers to strike any desired portion of the said supplementary sounding boards, as a means of causing different sounds or noises to be made by my improved device, when rotated or twirled, as above set forth.

It is to be understood that my device when sold on the sample, provides entertainment to the person purchasing the same since the parts may be assembled readily without gluing, hammering or without using any nails or the like.

Having thus described my invention, what I claim as new and desire to protect by Letters Patent of the United States is as follows:

1. In a toy of the class described, a handle, sounding boards secured to the handle and extending at right angles thereto, a pair of retaining members on the handle and extending transversely of the edges of the sounding members, cylindrical members pivotally mounted between the said retaining members, rods projecting from the cylindrical members and provided with axial openings, other rods slidably engaged in the axial openings, heads fixed on the free ends of said second rods, and arranged for striking the said sounding boards, the said second rods being formed with notches, and springs engaging the first mentioned rods and the said notches for holding the second rods in desired extended positions.

2. In a toy of the class described, a handle, sounding boards secured to the handle and extending at right angles thereto, a pair of retaining members on the handle and extending transversely of the edges of the sounding members, cylindrical members pivotally mounted between the said retaining members, rods projecting from the cylindrical members and provided with axial openings, other rods slidably engaged in the axial openings, heads fixed on the free ends of said second rods, and arranged for striking the said sounding boards, the said second rods being formed with notches, and springs engaging the first mentioned rods by reason of bent portions thereof engaged in the said axial apertures, and engaging the said notches for holding the second rods in desired extended positions.

3. In a toy of the class described, a handle, sounding boards secured to the handle and extending at right angles thereto, a pair of retaining members on the handle and extending transversely of the edges of the sounding members, cylindrical members pivotally mounted between the said retaining members, rods projecting from the cylindrical members and provided with axial openings, other rods slidably engaged in the axial openings, heads fixed on the free ends of said second rods, and arranged for striking the said sounding boards, the said second rods being formed with notches, and springs engaging the first mentioned rods by reason of bent portions thereof engaged in the said axial apertures and engaging the said notches by reason of inwardly protruding intermediate portions for holding the second rods in desired extended positions.

4. In a toy of the class described, a handle, sounding boards secured to the handle and extending at right angles thereto, a pair of retaining members on the handle and extending transversely of the edges of the sounding members, cylindrical members pivotally mounted between the said retaining members, rods projecting from the cylindrical members and provided with axial openings, other rods slidably engaged in the axial openings, heads fixed on the free ends of said second rods, and arranged for striking the said sounding boards, the said second rods being formed with notches, and springs engaging the first mentioned rods by reason of bent portions thereof engaged in the said axial apertures and engaging the said notches by reason of inwardly protruding intermediate portions for holding the second rods in desired extended positions, the said first mentioned rods being formed with slots thru which the said springs extend.

In testimony whereof I have affixed my signature.

ISADORE SLAFSKY.